(12) United States Patent
Dibble et al.

(10) Patent No.: US 7,296,257 B1
(45) Date of Patent: Nov. 13, 2007

(54) TECHNIQUES FOR EXCEPTION HANDLING BY REWRITING DISPATCH TABLE ELEMENTS

(75) Inventors: Peter C. Dibble, Bethel Park, PA (US); C. Douglass Locke, Mt. Lebanon, PA (US); Scott D. Robbins, Pittsburgh, PA (US); Pratik Solanki, Pittsburgh, PA (US)

(73) Assignee: TymeSys Corporation, Pittsburgh, PA (US)

( * ) Notice: Subject to any disclaimer, the term of this patent is extended or adjusted under 35 U.S.C. 154(b) by 628 days.

(21) Appl. No.: 10/211,933

(22) Filed: Aug. 1, 2002

(51) Int. Cl.
*G06F 9/45* (2006.01)
*G06F 9/44* (2006.01)
*G06F 11/00* (2006.01)

(52) U.S. Cl. .................. 717/127; 717/139; 712/244; 714/38; 710/262

(58) Field of Classification Search ............... 718/100, 718/102, 106; 717/100–154; 711/118, 153; 712/224, 242, 244
See application file for complete search history.

(56) References Cited

U.S. PATENT DOCUMENTS

| 5,432,795 | A | * | 7/1995 | Robinson ............... 717/125 |
| 5,628,016 | A | * | 5/1997 | Kukol .................... 717/140 |
| 5,842,017 | A | * | 11/1998 | Hookway et al. ........ 717/158 |
| 5,930,509 | A | * | 7/1999 | Yates et al. ............. 717/159 |
| 5,937,193 | A | * | 8/1999 | Evoy ..................... 717/140 |
| 5,987,529 | A | * | 11/1999 | Nakamura et al. ....... 719/328 |
| 6,038,661 | A | * | 3/2000 | Yoshioka et al. ........ 712/244 |
| 6,131,187 | A | * | 10/2000 | Chow et al. ............. 717/106 |
| 6,205,491 | B1 | * | 3/2001 | Callsen et al. .......... 719/315 |
| 6,226,789 | B1 | * | 5/2001 | Tye et al. ............... 717/138 |
| 6,289,446 | B1 | * | 9/2001 | Nilsson ................. 712/244 |
| 6,308,318 | B2 | * | 10/2001 | Krishnaswamy ......... 717/139 |
| 6,438,573 | B1 | * | 8/2002 | Nilsen .................... 718/100 |
| 6,535,903 | B2 | * | 3/2003 | Yates et al. ............. 718/100 |
| 6,634,023 | B1 | * | 10/2003 | Komatsu et al. ........ 717/159 |
| 6,901,587 | B2 | * | 5/2005 | Kramskoy et al. ....... 717/154 |
| 6,954,926 | B1 | * | 10/2005 | Nakamura .............. 717/151 |

OTHER PUBLICATIONS

"The Real-Time Specification for Java™," The Real-Time for Java Expert Group http://www.rtj.org, Greg Bollella, et al., The Reference Implementation Team, Doug Locke, et al. (2000).

* cited by examiner

*Primary Examiner*—Lewis A. Bullock, Jr.
(74) *Attorney, Agent, or Firm*—Hamilton, Brook, Smith & Reynolds, P.C.

(57) ABSTRACT

A technique for implementing a data processor to determine if an exception has been thrown. Specifically, the technique may be used in an interpretive environment where a table known as a bytecode (upcode) dispatch table is used. The dispatch table contains addresses for code that implements each bytecode. When the interpreter executes normally, these addresses point to the basic target machine code for executing each bytecode. However, when an Asynchrounously Interrupted Exception (AIE) is thrown, then the dispatch table is repopulated so that all byte codes point to routines that can handle the exception. These may point to a routine, such as an athrow, that has been extended to handle the special case of the AIE. Alternatively, the rewritten table can point to a routine that is specifically written to handle the firing of an AIE. The table contents are restored to their prior state once the exception handling is complete. The scheme may also be implemented non-rewriting of the table if a thread is in a non-Asynchronous Transfer of Control (to defer ATC) deferred state.

20 Claims, 2 Drawing Sheets

TECHNIQUES FOR EXCEPTION HANDLING BY REWRITING DISPATCH TABLE ELEMENTS

BACKGROUND OF THE INVENTION

Object oriented languages such as C++, Java and the like have emerged as the preferred tools for programmers. These widely used languages allow data structures and algorithms to be expressed in a way that is easy to understand. Another motivation for their use is that they can be expected to execute in a predictable way on many different computing platforms.

In another aspect, these languages have been widely adopted because of their so-called modularity. In particular, they are structured to encourage program development such that a commonly required set of operations is encapsulated in a separately named subroutine procedure, or object oriented "method." Once coded, such methods can be reused by calling them from any point in a main program. Furthermore, methods may "call" other methods and so forth so that in most cases, an executing program will not typically be a linear sequence of instructions, but rather a hierarchical tree of called methods.

This nesting of function calls simplifies the construction of programs but at the same time complicates the execution of methods, since one or more methods may be executing at any given time. The essence of method call execution is that a called method must pass any arguments or parameters to a target function, transfer control to a memory section holding the function's executable code, "return" with the result, and at the same time, store sufficient information to ensure that subsequent execution resumes immediately after the point where the original function call was made.

This function calling mechanism, as is well known in the art, is usually implemented by pushing and popping data and memory addresses on and off a stack prior to, during, and after the call. The stack is located in a dedicated portion of memory organized as a last in, first out data memory that is not normally manipulated directly by the programmer. Rather, its contents are changed only as a result of function calls under control of the operating system. Programmers therefore do not have direct access to this section of memory but do have access to another portion of memory, called the "heap", which is shared among threads.

Multitasking operating systems can thus adequately handle the parallel execution of most methods properly by managing both the heap and the stack. However, the need to handle a processing exception adds a layer of complexity. Such an exception occurs when a method encounters a logical situation in which it does not know how to further proceed. Even a simple method should predictably terminate if something unexpected happens, if a user does something foolish, if a resource that is expected to be available becomes unavailable or temporarily out of service, or even if a change to code inadvertently violates an assumption. One such unexpected situation might occur, for example, if while performing a division operation, a zero divisor is detected. In this instance, the arithmetic routine itself might know how to handle the operation. In other instances it might not know what to do, and enter an exception state. In a more catastrophic situation, a typical method may not know what to do, for example, if a memory fault occurs. In this instance, one would typically want the method to stop executing immediately.

Most exceptions that are attempted to be handled by programmers fall in between these two extremes. When an exception occurs, the currently executing code is in typically the best position to at least help to determine what the problem is. It can, for example, record any information that might help other parts of the program to recover, or for a human user using a debugger to figure out what has happened. So, for example, in the case of a divide by zero error, it would potentially record what the expression was whose value was zero that caused the error. In the case of a memory fault, it may be important to know what memory address was being accessed.

This information, what kind of thing went wrong, and the kind of specific additional information that might be used for figuring out what the problem was in order to correct it at some higher level, is encapsulated in a special kind of object known as an "exception object." There are many types of standard exception objects in Java, such as Pointer Exceptions, or Illegal Argument Exceptions, and the like. Furthermore, Java programs are allowed to define exception types of their own using inheritance properties.

LJava has an exception handling mechanism known as "throw" and "catch." A particular statement-type, "throw", is introduced to help define how an exception is to be handled. The throw statement abruptly terminates execution of the present method, and causes the exception object to propagate backwards along a return path to the calling routine. The exception object may propagate through all hierarchy levels until a compatible "catch" statement is encountered.

The effect of a throw statement is that execution abruptly returns on the call path until a method with a compatible "catch" clause is encountered. Thus, a throw statement looks a lot like a subroutine "return" statement with an argument. The argument must be some object that is legal to throw.

The catch clause contains statements which receive the passed object as arguments, and which are executed if and only if an appropriate type of exception is thrown. The parameter to the catch clause determine the appropriate exception type. Inside the catch clause body, a parameter name is used to refer to the exception. A number of catch clauses can be associated with a single "try" statement according to the syntax rules of Java.

The throw-catch mechanism works well if the thread that throws the exception is also the same thread that catches it. This is a case of a so-called synchronous exception in the sense that the same thread that throws the exception ends up determining how to handle it.

However, certain emerging standards for Java operating environments such as the Real Time Specification for Java (RTSJ) dictate that the operating environment must be able to accommodate a situation where an exception may be thrown at a thread from another thread. In particular, in an environment where many threads may be executing in real time, each thread must accommodate the possibility that exceptions may be thrown at it from other threads. This markedly complicates management of the control flow during the handling of a thrown object.

In a reference implementation given for RTSJ, it is suggested that an interpreter should check for an Asynchronously Interrupted Execution (AIE) while executing every bytecode (instruction), e.g., determine whether any other thread is attempting to throw an exception at it. If this is the case, then the interpreter forces the thread to throw the exception at itself.

While this approach will work, it is particularly onerous. First of all, having to check for an AIE at each and every bytecode is inefficient. In fact, it is estimated that to implement this scheme might potentially double the cost of executing bytecodes. Thus program speed could be reduced by as much as one-half if this approach is taken. Such a marked reduction in program speed is of particular concern in real time systems.

Other approaches could be taken, such that exception testing is only done on a periodic basis or only for certain types of bytecodes. For example, a bytecode interpreter could be instructed to check whether an exception has been thrown on every third instruction or only on branch instructions. It turns out, however, that counting instructions to determine if one is on the third instruction is almost as slow as checking at every bytecode. Furthermore, checking only on certain types of branch instructions could violate timing constraints in the RTSJ if a section of code is encountered which has many instructions between branches.

SUMMARY OF THE INVENTION

The present invention is a technique for implementing a scheme for determining whether an exception has been thrown. Specifically, it builds on an interpretive environment with a table known as an opcode or bytecode dispatch table. More specifically, the interpreter used as a basis for this invention is a Java bytecode interpreter structured in such a way that it decodes bytecodes into jump instructions or function calls through a dispatch table containing addresses for the code to implement each bytecode. When the interpreter is executing normally, these addresses point to the basic implementation code for executing each Java bytecode.

For example, a first entry in the table might point to the code that implements a "nop" instruction, and a second entry in the table points to the code to execute an "aconst_nulr", and so on.

When an Asynchronously Interrupted Exception (AIE) is thrown at the thread then the dispatch table is repopulated so that all bytecodes to point to routine(s) that throw an Asynchronously Interrupted Exception (AIE). Thus, the dispatch table is repopulated with addresses to handle the AIE, instead of the bytecode instructions that would normally be executed. The operation in the table will restore the dispatch table to its prior state, then throw the AIE, or if the state is ATC-deferred, continue execution by re-dispatching the current bytecode through the restored table.

In an alternate embodiment, a pointer to the instruction decode table, rather than the table itself, might be rewritten. Of course, patching a pointer to the table rather than rewriting the dispatch table may cause the interpreter to execute a little more slowly. However, it does have the benefit of not requiring rewriting of table contents.

In another alternative, the fire method only rewrites the target thread's dispatch table if the thread is not in ATC-deferred state. If the target is ATC-deferred, the fact that an AIE is pending will be noted, and the current operation will continue until it is no longer ATC deferred. At that time, the AIE will be thrown immediately.

The table can be overwritten either with the routine for the athrow bytecode (in which case the athrow bytecode is extended to handle the special case of the AIE), or it can be overwritten with a new routine that is specially written to handle firing an AIE. The second alternative is slightly preferred since it reduces overhead on throwing other exceptions, but it does require modifying the instruction dispatch table, or the pointer to the instruction dispatch table on a per-thread basis.

Certain other rules are also required by some specifications such as the Real Time Specification for Java (RTSJ).

For example, if the thread at which an exception is thrown is in the Asynchronous Transfer of Control (ATC) deferred state, the RTSJ specifies that the thread is not interruptible. As detailed above, this can be handled either by the routine with which fire populates the dispatch table, or fire can set a flag in the target thread and not repopulate its dispatch table. In the latter case, the target thread must check the flag each time it re-enables ATC.

One advantage of rewriting the dispatch table is that it greatly reduces the cost of executing code that is not currently handling an AIE. Instead of polling at the interpretation of every bytecode, the interpreter only needs to check for a pending AIE at certain bytecodes that might transfer control into code that is not ATC-deferred. In particular, the step of rewriting the table or the pointers to the table is taken by the thread that throws the exception, prior to the actual exit from that thread. This eliminates the need for a normally executing thread to do anything special to handle exceptions thrown at it; the throwing thread is instead the one thread which bears the cost of re-writing the table.

The technique is extensible to other instances where a thread needs to make another thread do something which must happen quickly, regardless of what that target thread itself might be programmed to do. In some cases this might be done by rewriting the code the other thread will execute, but this has difficulties including discovering what code the target thread will execute, ensuring that only the target thread will execute that code, and writing the memory (the code may be located in read-only memory). In certain cases the technique of overwriting the dispatch table can conveniently and efficiently substitute for rewriting the code a thread will execute.

For example, in a hierarchy of threads, a particular thread might need to be called on any particular level of a hierarchy but would not want to be called at certain other levels of the hierarchy. This approach permits the calling thread to dictate exactly what happens on throwing the exception, regardless of the hierarchy.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Terminology Used in This Document:

| | |
|---|---|
| AI: | Asynchronously interruptible; a region of code that is susceptible to ATC. |
| AI-deferred: | A lexical region of code in which ATC is deferred, namely, methods that do not declare AIE in their 'throws' clause and regions within a synchronized statement |
| AIE: class | AsynchronouslyInterruptedException |
| ATC: | Asynchronous Transfer of Control |
| ATC-deferred: | see AI-deferred. |
| Athrow bytecode | The JVM bytecode that causes the JVM to execute the transfer of control caused by throwing an exception. |
| athrow labels array: | The static array of pointers to the label for the athrow bytecode. Of the same size and type as the bytecode array. Every element points to the same opcode label, athrow. |
| bytecode array: | The static array of pointers to labels used when the JVM is compiled with that option. |
| Bytecode PC | The bytecode interpreter's indication of the next bytecode to execute for a given thread. |
| dispatch table | Indirect jump table used by bytecode interpreter to locate emulation code for each bytecode |
| ee: | A pointer to a struct CVMExecEnv, the per-thread execution context metadata. |
| executejava | The C function that implements the top level of the JVM's bytecode interpreter |
| opclabels pointer: | The pointer to the bytecode array. |
| target thread: | The RealtimeThread object receiving the AIE |
| Timed: class | Timed which extends AIE |

The present invention implements a scheme for handling an exception in an interpretive computing environment whereby an opcode or 'bytecode' dispatch table, is rewritten. When the interpreter is executing normally, the addresses of the dispatch table point to the basic code that implements each instruction bytecode. However, when an exception is thrown at a thread, the dispatch table is repopulated so that the pointers in the dispatch table instead point to routines that are specifically enabled to handling the exception, instead of the routines that would otherwise normally be executed.

Figure 1:
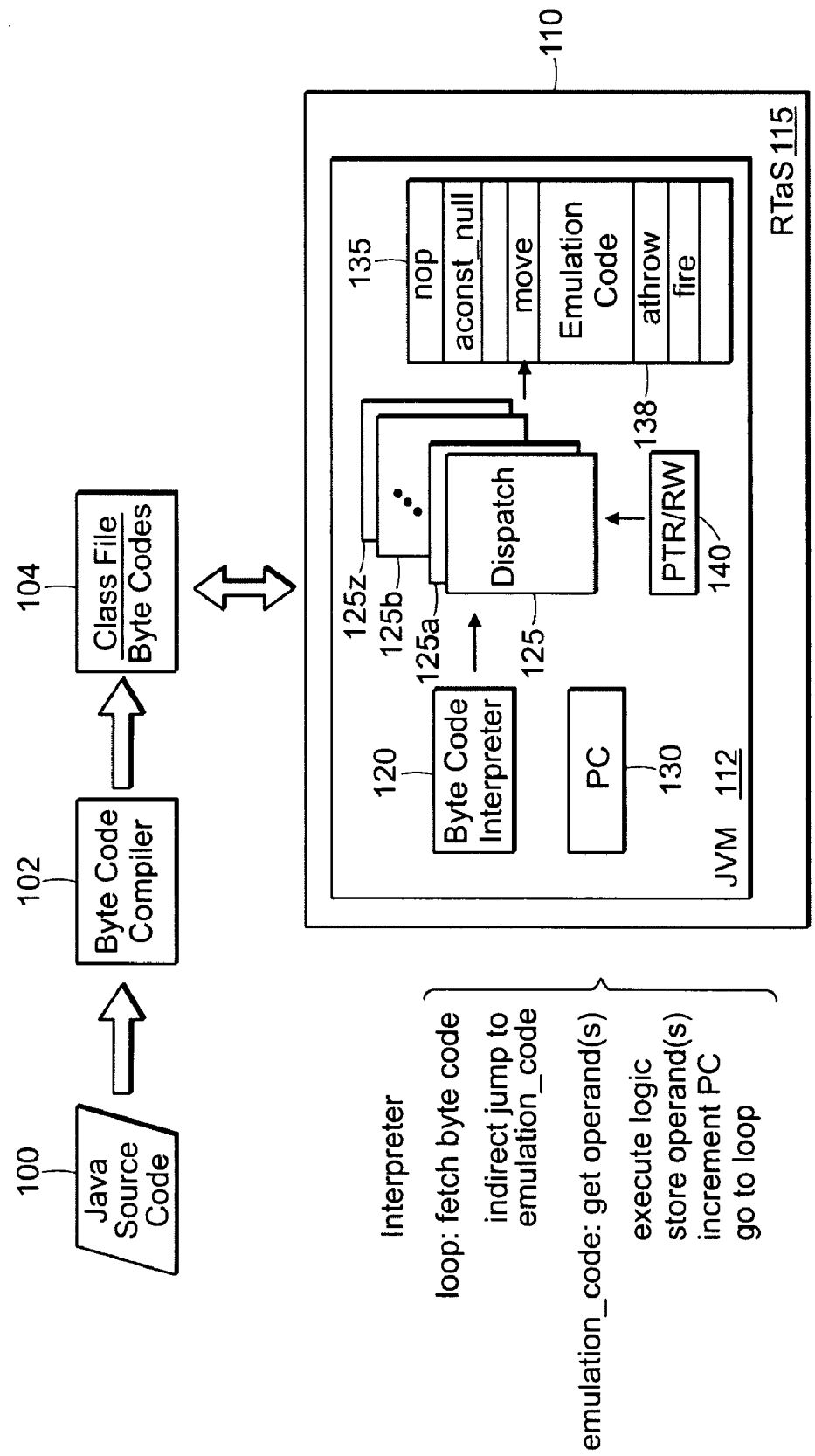
FIG. 1 is a flow diagram illustrating a JAVA platform and how a bytecode dispatch table is rewritten.

The invention is of particular use in an interpreter such as a Java bytecode interpreter that executes in a Real Time Operating System (RTOS) environment. One such environment is shown in FIG. 1. Here, a programmer creates program logic as source code 100 in the Java language. The Java source code 100 is then fed to a Java compiler 102. The Java compiler 102 checks not only to see that the source code syntax is correct defined in the Java language, but also ensures that the code does not violate Java's special safety rules. Similar to other compilers, the Java compiler 102 takes the human readable source code as input and generates a bytecode class file 104 as output. The bytecode file 104 is in a form suitable for a machine to interpret. The difference here is that the machine that the Java compiler 102 targets is not the native machine code for a particular computer; rather, the targeted machine is a Java Virtual Machine (JVM) 112. As is known the art, a JVM 112 may execute on a number of different computing platforms.

Each bytecode command generated by the Java compiler 102 consists of an opcode and one or more operands. The opcode is the particular command that an interpreter 120 within the JVM 112 can recognize. The operand or operands are the data needed to execute the opcode. Opcodes in a JVM 112 are executed sequentially and stored as eight-bit numbers. Operands vary in length, but all may be divided into bytes. The Java compiler 102 enforces sizes for bytecode commands and symbolic operand address references.

The interpreter 120 is able to locate pieces of emulation code 135 in a memory using the bytecodes assigned by the compiler 102. More specifically, at run time, the class file 104 containing bytecodes for the program are fed to the JVM 112. This may be running within the context of a real time operating system 115 (RTOS) in the case of the preferred embodiment. The JVM 112 performs many functions, some of which are related to the purpose of security and others that are performed as part of execution of the Java applications and still others associated with managing memory. Once the code has been loaded into the JVM, and verified, it is executed one piece at a time by code interpreter 120. Only a portion of a JVM 112 is shown in FIG. 1 herein for clarity; specifically, the portions shown in FIG. 1 are those which illustrate how the bytecode interpreter 120 operates.

The bytecode interpreter 120 executes a logical loop as illustrated in the pseudocode description to the left of the block diagram. As shown, the interpreter 120 first fetches a bytecode as pointed to by the current contents of the program counter (PC) 130. The bytecode, and specifically the opcode portion of the fetched bytecode, is then used to do a lookup in the dispatch table 125. The dispatch table contains entries that point to locations in an emulation code memory 135. The interpreted bytecode thus causes an indirect jump to the native emulation code associated with the particular bytecode.

For example, in the case of bytecode 0, the dispatch table points to the instruction for a nop.

In the case of bytecode 1, the dispatch table points to the code for an aconst_null.

Similarly, other bytecodes point to emulation code for move instructions, as well as exception throwing instructions such as athrow, and the like.

The emulation code section associated with each Java bytecode contains appropriate target machine native instructions for executing each Java bytecode. These depend upon a specific instruction being implemented but may generally include, for example, code to get operands, execute particular instruction logic, store operands, and then increment the PC prior to returning.

In connection with the present invention, contents of the dispatch table 125 are rewritten and/or different prestored dispatch tables 125a, 125b are selected for use by the JVM 112 at particular logical states associated with efficient handling of exceptions.

For example, when the interpreter 120 is executing normally, that is, without appending exception, the addresses in a dispatch table 125 point to the corresponding basic emulation code for each Java bytecode.

However, when an Asynchronously Interrupted Execution (AIE) is thrown at a thread then the dispatch table 125 is rewritten. In particular, the dispatch table is rewritten such that all bytecodes then point to routines in the emulation code that throw an Asynchronously Interrupted Exception (AIE). Thus, the dispatch table is repopulated with the addresses of the athrow code 138 that handles the AIE, instead of the other bytecode instructions that would normally be pointed to. A particular operation will restore the dispatch table to its prior state, and then throw the AIE in the case of ATC non-deferred operation. However, if the thread execution state is ATC deferred, execution will simply continue by re-dispatching the current bytecode through the restored table.

As was alluded to above, a single dispatch table 125 may be used in one embodiment. In this embodiment, each of the 256 entries of the dispatch table 125 are rewritten to point to the code for an athrow 138. However, in alternate embodiments, multiple dispatch tables 125a, 125b, . . . 125z may be implemented. In this case, a pointer 140 is rewritten to point to the desired dispatch table depending upon the execution state.

Also in a preferred embodiment, it is the exception throwing thread that is responsible for rewriting the contents of the dispatch table 125 and/or rewriting the pointer 140. This avoids the need for other routines to constantly check for the existence of an AIE.

But in another alternative implementation, the firing method only rewrites the table or the pointer, when the ATC state is not deferred in the target thread. If the target thread is in ATC-deferred state, the fire operation sets a flag in the target thread, which will then throw the exception if it sees that the flag is set when it exits ATC-deferred state.

Certain execution rules must be observed in certain operating environments, such as those defined in Bollella G. et al., *Real Time Specification for Java (RTSJ)*, Copyright 2000, Addison-Wesley (ISBN 0-201-70323-8). For example, if a thread at which an exception is thrown is in an asynchronous transfer of control deferred state, the RTSJ specifies that the thread should not be interruptable. The above process will correctly observe this requirement of the RTSJ.

Each of these various execution states are now described in greater detail below in connection with one implementation for the RTSJ.

Figure 2:
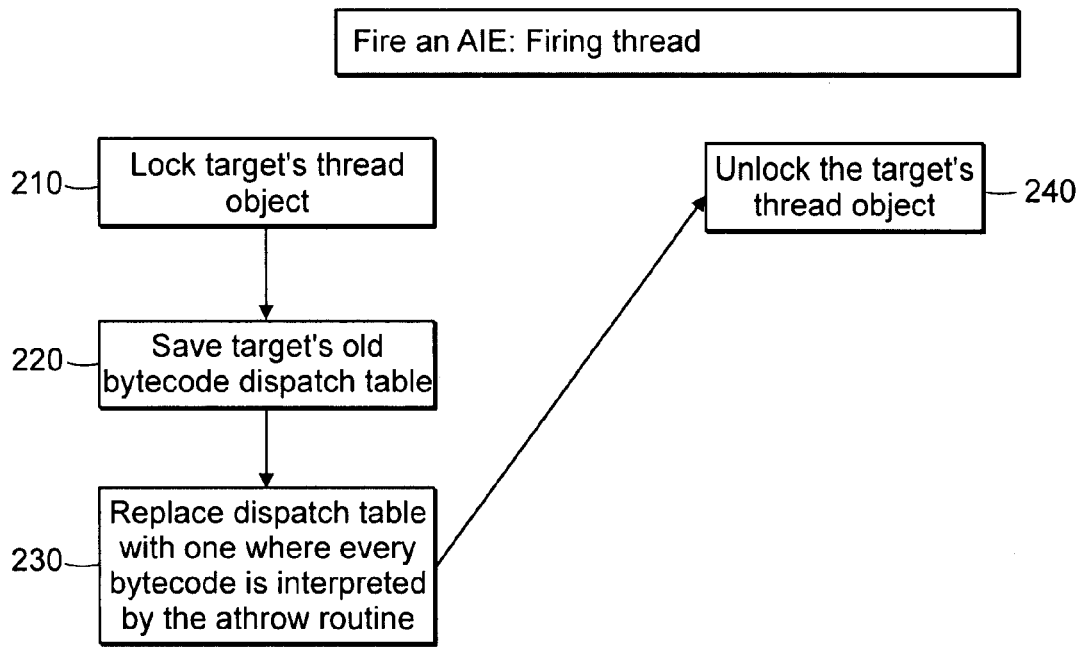
FIG. 2 is a flow diagram of one method for a thread to fire an Asynchronously Interrupted Execution (AIE), replacing the dispatch table.

A specific logic flow for a thread which fires an AIE is shown in FIG. 2. For example, in a first step 210, the target thread object is locked. In a next step 220, the target's old bytecode dispatch table is stored; alternatively, the contents of the pointer to a set of dispatch tables which it was using may be stored. In a next state 230, the dispatch table 125 is replaced with a dispatch table where every bytecode is interpreted or points to the athrow routine 138. Finally, in the state 240, the target's thread object may then be unlocked so that execution can continue.

Figure 3:
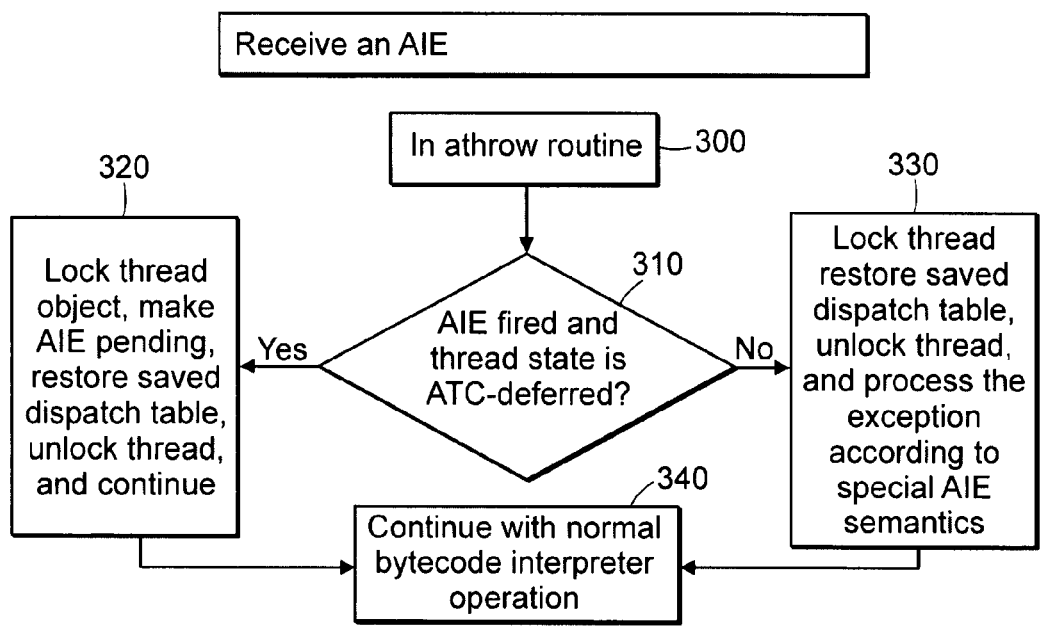
FIG. 3 is a flow diagram of one method for the receiving athrow routine.

FIG. 3 illustrates a process flow which occurs when the athrow routine 138 is executed. There, from an initial state 300, a step 310 is entered. In this step, it is determined that the AIE was fired and whether the thread state was ATC deferred. If the thread is in an ATC deferred state, that is, asynchronous transfer of control should not occur, that is, interrupts are not allowed, then the thread object is locked in state 320. Here, the AIE may be changed to a pending state and the original dispatch table content is restored. At this point, the thread can be unlocked and execution can be permitted to continue in state 340.

If, however, in step 310 the thread was in an ATC deferred state, then a non-deferred state 330 may be entered. Here, the thread object is locked. The saved dispatch table is restored, the thread is unlocked, and then processing proceeds to handle the exception according to the particular semantics as specified by the AIE.

The advantage of this strategy is that it greatly reduces the cost to code that is not currently handling an AIE. For example, instead of polling at every bytecode, the particular emulation code need only have to check for a pending AIE when it could be in an ATC deferred state.

The following is a more detailed description of how to implement exception handling by replacing dispatch table elements in a real time Java environment. The reader is expected to have some familiarity with the implementation of Java bytecode for athrow, and calling fire( ) and interrupt( ) as described in the above-referenced RTSJ.

ATC begins when one thread calls interrupt( ) on a RealtimeThread or fire( ) on an AIE executing a doInterruptable method. Both of these library routines eventually call the postAIE(AIE aie) method of the RealtimeThread to be interrupted with the AIE to interrupt the thread. This method is synchronized on the thread object. Under this lock, a reference to the exception is copied to the target thread's ee in the "incoming AIE" field, and appropriate flags are set including the "new-AIE-posted" flag. The ee holds a reference to the target's current local opclabels pointer which is altered to point to the athrow labels array. This means that the next bytecode the target thread executes, no matter what, will be the athrow bytecode. The postAIE method returns, releasing the lock on the thread object. This concludes the process for firing an AIE or calling interrupt( ) on another thread.

The athrow bytecode routine in the bytecode interpreter is instrumented to check the "new-AIE-posted"; if false, it executes as normal. If true, the athrow bytecode routine acquires the lock on the thread object and checks whether the current thread is in a deferred mode. If it is, the routine sets the opclabels pointer back to normal, releases the lock and runs CONTINUE. This continues without changing the bytecode PC, so execution will continue by re-executing the same bytecode, now restored to its value before it was replaced with athrow.

If ATCs are not deferred, the athrow routine moves the AIE from the incoming field, to the "currently being processed" field (the field used for normally thrown exceptions), then clears the flag, sets the opclabels pointer back to normal and releases the mutex. The athrow routine then jumps to the handle_exception label in the interpreter and processing continues at HandleException (in interpreter.c). Here, the code that resolves the catching frame for the exception is modified to exclude frames that are declared as "throws AIE."

The details of one implementation of the invention are now described.

1. The Opclabels Stack.

The basis of this interruption routine is that the opclabels pointer used in CONTINUE is changed remotely, from pointing to the static opclabels_data, to a new static array atclabels_data (consisting of 256 pointers to the label opc_athrow). To do this, we need to maintain a reference to the local variable opclabels. The executejava routine can be recursive, and opclabels needs to point to the most recent instance of opc_athrow. This requires a stack, and rather than build that stack in the heap, since we're keeping track of data in the C stack, it makes sense to build that stack in the C stack with the nodes of the stack being simple locals, this way, every invocation of executejava will automatically have its own node. This can be done with some new structs:

```
typedef struct local_opclabels_node {
    /* ref to node of previous executejava invocation, or null */
    struct local_opclabels_node *prev;
    /* pointer to opclabels, which is a pointer to the first
        element ofan array of pointers to void */
    void*** local_opclabels;
} local_opclabels_node;
```

A pointer to a local_opclabels_node, named opclabels_stack_head is kept in the ee. New nodes are "allocated" as a locals by executejava just before it begins bytecode interpretation. Nodes are "freed" when the executejava function returns. Mutation of the stack is protected under the thread object mutex. During the addition of new elements, the value of the opclabels pointer (that is, the value of the local variable opclabels) is set to the value of the previous opclabels pointer, which is then set to point to the normal opclabels array. This has the effect of inheriting the interrupted status of the previous executejava routine into the current one. Similarly, when an executejava routine returns, it copies the current value of opclabels into the previous opclabels, thus pushing the interrupted status back to the previous invocation.

```
executejava on invoke:
void** opclabels = &(opclabels_data[0]);
local_opclabels_node opclabels_node;
synch(<current thread object>){
    /* fill in the data */
    opclabels_node.local_opclabels = &opclabels;
    /* insert into the stack */
    opclabels_node.prev = ee->opclabels_stack_head;
    /* set ee-atclabels for the first time if this has not already
been done */
    ee->opclabels_stack_head = &opclabels_node;
    if(ee->atclabels == null){
        ee->atclabels = &(atclabels_data[0])
    }
    if(opclabels_node.prev != null){
        /* 'inherit' the previous stacks interrupded status */
        opclabels = *((opclabels_node.prev)->local_opclabels);
        /* we now deal with the interrupt (if there is one) */
        *((opclabels_node.prev)->local_opclabels) =
                    &(opclabels_data [0]);
    }
}
executejava on return:
synch(<current thread object>){
    /* remove from the stack */
    ee->opclabels_stack_head = opclabels_node.prev;
    if(opclabels_node.prev != null){/* push our interrupted state back to
        the previous invocation */
        *((opclabels_node.prev)->local_opclabels) = opclabels;
    }
}
```

2. Changes to CVMExecEnv, CVMFrame, and ExecuteJava.

Those include changes to CVMExecEnv, and their initial values set in CVMinitExecEnv:

```
/* the incoming (initially pending) AIE */
CVMThrowableICell* pendingAIExceptionICell =
            CVMjniCreateLocalRef(ee); /* null ref */
/* True if exception is held pending. Basically it's true when
    AIExceptionPendingICell is valid */
```

```
CVMBool pendingAIExceptionFlag = CVM_FALSE;
/* if non-null, then points to the head of the opclabels_stack. MUST be
accessed under protection of ee's thread object's lock. Set during the first
invocation of executejava */
local_opclabels_node* opclabels_stack_head = null;
/* a pointer to the alternate labels array set during the first invocation
of executejava */
void** atclabels = null;
```

Additions to CVMFrame and their initial values set in the CVMpushFrame macro:

```
/* the frame is deferred if nonzero. monitorenter and monitorexit opcodes
increment and decrement this value by one. When an AI method begins
execution, this frame is initially decremented (making it nondeferred */
CVMUint32 ATCdeferral = 1;
```

Additional local variables to ExecuteJava:

```
static void* atclabels_data[256] =
        {&&opc_191,&&opc_191,&&opc_191 ... }
```

Additional local variables to HandleException:

```
/* initialized to the AIE class block once in an if null condition */
static CVMClassBlock* aieClass=null;
```

3. Other Macros.

Defined in interpreter.h, these macros make it possible to access the ATC metadata. Macros for handling the pending AIException flag:

```
/* if true, then there is currently a pending AIE */
#define CVMpendingAIException ee) \
        ((ee)->pendingAIExceptionFlag == CVM_TRUE)
/* these set and clear the flag */
#define CVMsetPendingAIExceptionFlag(ee) \
        ((ee)->pendingAIExceptionFlag = CVM_TRUE)
#define CVMclearPendingAIExceptionFlag(ee) \
        ((ee)->pendingAIExceptionFlag = CVM_FALSE)
```

Here are the macros for handling the AIException, pay close attention to how to set and get the icells, we can't just set their values directly:

```
/* returns a reference to the pendingICell */
#define CVMpendingAIExceptionICell(ee) \
        ((ee)->pendingAIExceptionICell)
/* returns the direct object pointed to by the icell */
#define CVMgetPendingAIExceptionobj(ee) \
        (CVMID_icellDirect(ee, CVMpendingAIExceptionICell(ee)))
/* set the direct object pointed to by the icell */
#define CVMsetPendingAIExceptionObj(ee, targetEE, obj_){ \
        CVMID_icellSetDirect(ee, \
        CVMpendingAIExceptionICell(targetEE), obj_); \
}
```

-continued

```
/* clear the pendingAIException and its flag */
#define CVMclearPendingAIException(ee) { \
        CVMID_icellSetNull(CVMpendingAIExceptionICell(ee)); \
        CVMclearPendingAIExceptionFlag(ee); \
}
```

These two should be executed exclusively, i.e., the executor of these must hold the thread lock (in the first macro, that's the thread associated with ee, in the second, with targetEE).

```
/* set the localException to the AIException, clearing the AIException and
AIExceptionFlag, and setting the currentAIE flag as well, *must* hold
thread object lock when executing this.*/ #define
CVMmovePendingAIEtoLocalException(ee){ \ CVMgUnsafeThrow-
LocalException(ee,\
        CVMgetPendingAIExceptionObj(ee));\
        CVMclearPendingAIException(ee);\
}
/* This is how AI exceptions actually get posted. This macro uncondition-
ally sets targets exec env pending object to obj */
#define CVMsetPendingAIException(ee, targetEE, obj) { \
        CVMD_UnsafeExec(ee,{ \
            CVMsetPendingAIExceptionObj(ee, targetEE, obj); \
            CVMsetPendingAIExceptionFlag(targetEE); \
        }); \
}
```

4. At the Beginning, postAIE.

The private native void postAIE(RealtimeThread target) is an instance method of AIE. It must be run inside of a mutex on the target thread. It then unconditionally puts 'this' (the AIE) onto the target thread context. It runs the CVM-SetPendingAIException after computing the target (argument) thread's ee. Next the poster runs the macro which sets the current local opclabels value (via opclabels_stack_head reference) to the atclabels value stored in the ee. Finally, the thread mutex is released and posting is finished.

5. The Receiving Athrow.

The receiver will find itself suddenly executing the athrow bytecode. Since this isn't a reserved bytecode, it first tests why it is here, by checking CVMpendingAIException(ee). If false the bytecode continues, execution as normal. If true, it acquires the thread object lock and sets the opclabels pointer back to &(opclabels_data[0]). It then checks the deferred status. If greater than zero (deferred) the lock is released and the CONTINUE macro is run. Of nondeferred, then CVMmovePendingAIEtoLocalException(ee) is run.

At this point the AIE is now in the same state it would be in if it had it just been thrown by the local code. The mutex is released and the bytecode jumps to the handle_exception macro, which runs CVMgcUnsafeHandleException.

6. HandleException Implements AIE Semantics.

CVMgcUnsafeHandleException takes the exception and returns the catching frame (the method and PC where execution resumes; it is modified slightly. Specifically, the HandleException method checks whether there is a locally thrown exception (checks CVMlocalExceptionThrown.) If there is, then it propagates that as normal. If there isn't a normal exception, it checks whether there's a pending exception and propagates it with the modified semantics. After finding a destination frame for a normal exception, it checks whether that frame is AI and whether there's a pending AIE. If so, the normal exception is dropped and the pending AIE is propagated with AIE semantics.

While this invention has been specifically shown and described with references to preferred embodiments thereof, it will be understood by those skilled in the art that various changes in form and details may be made therein without departing from the scope of the invention encompassed by the appended claims.

What is claimed is:

1. A method for handling exceptions in a data processor comprising:

providing a bytecode dispatch table having a list of addresses, each address associated with a starting location for executable code associated with a bytecode to be interpreted;

upon an exception, rewriting at least one address in the list of addresses in the bytecode dispatch table, so that the bytecode dispatch table points to an address associated with other executable code for handling the exception; and if an Asynchronous Transfer of Control (ATC) state is enabled, then rewriting the bytecode dispatch table so that the rewritten locations point to executable code that handles an Asynchronously Interrupted Exception (AIE).

2. A method as in claim 1 additionally comprising:

if the ATC state is not enabled, then not rewriting the bytecode dispatch table.

3. A method as in claim 1 additionally comprising using a pointer as part of the bytecode dispatch table; and rewriting bytecode dispatch table contents by rewriting the pointer.

4. A method as in claim 1 wherein a thread that throws the exception performs the step of rewriting the bytecode dispatch table.

5. A method as in claim 1 additionally comprising:

if an ATC state is deferred, storing information indicating that an exception is pending; and permitting execution to occur without rewriting the bytecode dispatch table.

6. A method as in claim 5 additionally comprising:

once the ATC state changes back to enabled, rewriting the bytecode dispatch table to then handle the AIE.

7. A method as in claim 1 additionally comprising:

rewriting the bytecode dispatch table with an address that points to a routine that is extended to handle the exception.

8. A method as in claim 1 wherein a plurality of tasks are executing and each executing task has a respective byte code dispatch table.

9. A method for handling exceptions in a data processor comprising:

providing a bytecode dispatch table having a list of addresses, each address associated with a starting location for executable code associated with a bytecode to be interpreted;

upon an exception, rewriting at least one address in the list of addresses in the bytecode dispatch table, so that the bytecode dispatch table points to an address associated with other executable code for handling the exception; and rewriting the bytecode table with an address that points to a routine that handles firing an Asynchronously Interrupted Exception (AIE).

10. A method as in claim 9 wherein a plurality of tasks are executing and each executing task has a respective byte code dispatch table.

11. A data processor comprising:
- a bytecode dispatch table having a list of addresses, each address associated with a starting location for native mode code associated with an instruction to be executed; and
- a bytecode dispatch table content controller, for detecting an exception, and for rewriting at least one address in the bytecode dispatch table with an address that points to native mode code associated with handling the exception, where the controller determines if an Asynchronous Transfer of Control (ATC) state is enabled, and if so, rewrites the bytecode dispatch table so that all the rewritten locations point to native mode code that handles an Asynchronously Interrupted Exception.

12. A data processor as in claim 10 wherein the controller additionally determines if the ATC state is not enabled, and then not rewriting the bytecode dispatch table.

13. A data processor as in claim 11 additionally comprising:
- a pointer coupled to the bytecode dispatch table, used for determining the location of the bytecode dispatch table for each task, and
- wherein the controller further rewrites the bytecode dispatch table by rewriting the pointer.

14. A data processor as in claim 11 wherein the controller additionally rewrites at least one address in a bytecode dispatch table for at least one task, to point to code that responds to a thread throwing the exception.

15. A data processor as in claim 10 wherein the controller additionally stores information indicating that an exception is pending when the ATC state is deferred, and then permits execution of the data processor to continue without rewriting the bytecode dispatch table.

16. A data processor as in claim 15 wherein the controller additionally rewrites the bytecode dispatch table if the ATC state then changes back to enabled.

17. A data processor as in claim 11 wherein the controller additionally rewrites the bytecode dispatch table with an address that corresponds to a routine for an instruction that is extended to handle the exception.

18. A data processor as in claim 11 wherein a plurality of tasks are executing and each executing task has a respective byte code dispatch table.

19. A data processor comprising:
- a bytecode dispatch table having a list of addresses, each address associated with a starting location for native mode code associated with an instruction to be executed;
- a bytecode dispatch table content controller, for detecting an exception, and for rewriting at least one address in the bytecode dispatch table with an address that points to native mode code associated with handling the exception; and
- the controller additionally rewrites the bytecode dispatch table with an address that points to a routine that handles firing a Asynchronously Interrupted Exception.

20. A data processor as in claim 19 wherein a plurality of tasks are executing and each executing task has a respective byte code dispatch table.

* * * * *

UNITED STATES PATENT AND TRADEMARK OFFICE
CERTIFICATE OF CORRECTION

PATENT NO. : 7,296,257 B1
APPLICATION NO. : 10/211933
DATED : November 13, 2007
INVENTOR(S) : Peter C. Dibble et al.

Page 1 of 1

It is certified that error appears in the above-identified patent and that said Letters Patent is hereby corrected as shown below:

On Title page item (73) Assignee:

delete "TymeSys Corporation" and insert --TimeSys Corporation--

Signed and Sealed this

Twenty Second Day of April, 2008

JON W. DUDAS
*Director of the United States Patent and Trademark Office*